(12) United States Patent
Turple

(10) Patent No.: US 9,770,953 B2
(45) Date of Patent: Sep. 26, 2017

(54) ULTIMATE TIRE LIFT BAR

(71) Applicant: Philip Turple, North Bend, WA (US)

(72) Inventor: Philip Turple, North Bend, WA (US)

( * ) Notice: Subject to any disclaimer, the term of this patent is extended or adjusted under 35 U.S.C. 154(b) by 0 days.

(21) Appl. No.: 15/049,042

(22) Filed: Feb. 20, 2016

(65) Prior Publication Data

US 2017/0240009 A1    Aug. 24, 2017

(51) Int. Cl.
*B60C 25/02* (2006.01)
*B66F 15/00* (2006.01)

(52) U.S. Cl.
CPC .............. *B60C 25/02* (2013.01); *B66F 15/00* (2013.01)

(58) Field of Classification Search
CPC ................................. B60C 25/02; B66F 15/00
USPC .......................................................... 254/120
See application file for complete search history.

(56) References Cited

U.S. PATENT DOCUMENTS

| | | | | |
|---|---|---|---|---|
| 671,554 | A * | 4/1901 | Heisler ................... | B66F 15/00 254/120 |
| 2,311,789 | A * | 2/1943 | Taylor ..................... | B60C 25/02 157/1.3 |
| 2,504,345 | A * | 4/1950 | Nellis ................... | B60B 29/001 254/120 |
| 2,553,327 | A * | 5/1951 | Norman ................... | B65G 7/12 254/120 |
| 2,579,853 | A * | 12/1951 | Pardee ................... | B66F 15/00 254/131 |
| 2,808,162 | A * | 10/1957 | Hellyer ................. | B60B 29/001 254/131 |
| 3,378,154 | A * | 4/1968 | Mousel .................... | B66F 15/00 414/428 |
| 4,334,669 | A * | 6/1982 | Ross ....................... | B27B 15/02 254/120 |
| 5,180,141 | A * | 1/1993 | Hunt ..................... | B60B 29/001 254/131 |
| 5,265,661 | A * | 11/1993 | Tran ........................ | B60C 25/02 157/1.3 |
| 5,562,389 | A * | 10/1996 | Mitchell ................. | B60B 29/00 254/131 |
| 5,806,578 | A * | 9/1998 | Gonzaga ................. | B60C 25/02 157/1.3 |
| D412,271 | S | 7/1999 | Kliskey | |
| 6,237,666 | B1 * | 5/2001 | Magnani ............... | B60C 25/132 157/1.2 |
| 6,684,927 | B1 * | 2/2004 | Kliskey ................... | B60C 25/02 157/1.17 |
| 8,118,281 | B1 * | 2/2012 | Nolan ..................... | B66F 15/00 254/119 |
| 8,220,851 | B1 | 7/2012 | Dawes | |
| 2,212,716 | A1 | 1/2016 | Merrick | |
| 2002/0144790 | A1 * | 10/2002 | Spaggiari ................ | B60C 25/02 157/1.3 |
| 2003/0221303 | A1 * | 12/2003 | Oleski ..................... | B66F 15/00 29/273 |
| 2005/0211961 | A1 * | 9/2005 | Edwards ................. | B66F 15/00 254/25 |
| 2007/0210595 | A1 | 9/2007 | Quiles | |

(Continued)

*Primary Examiner* — George Nguyen
(74) *Attorney, Agent, or Firm* — Berggren, Inc.

(57) ABSTRACT

This invention relates to a tire lifting and removing tool of that facilitates shifting of tires on/off the trucks or the like, holding the tire at a place. The tool may be used for removing the spacer rings between the tires, as a pry bar. The tool allows an upper tire bead to be lifted beyond its wheel rim flange in one lever-like operation.

2 Claims, 2 Drawing Sheets

(56) References Cited

U.S. PATENT DOCUMENTS

| | | | |
|---|---|---|---|
| 2010/0044657 A1* | 2/2010 | Patrick | B66F 15/00 254/130 |
| 2011/0113566 A1* | 5/2011 | Holbrook | B25F 1/006 7/146 |
| 2012/0061631 A1* | 3/2012 | Edwards | B66F 15/00 254/129 |
| 2013/0192040 A1* | 8/2013 | Townsend | B25C 11/00 29/426.5 |

* cited by examiner

ULTIMATE TIRE LIFT BAR

CROSS REFERENCE TO RELATED APPLICATIONS

Not applicable

FEDERALLY SPONSORED RESEARCH AND DEVELOPMENT

Not applicable.

MICROFICHE

Not applicable

BACKGROUND OF THE INVENTION (1) Field of the Invention

The present invention relates to the field of automotive tools. The invention, particularly relates to a tire lifting and removing tool.

(2) Background of the Invention

A conventional pneumatic tire for motor vehicles and the like has a bead along the radial inner edge of the tire, which engages with axial pressure, due to tire inflation, against the radially outermost lip of the wheel rim flange on both opposite sides of the wheel. The bead and the rim flange in each case are continuous circles, and the bead is slightly smaller in diameter than the rim flange. The bead normally has embedded wire reinforcement, but is sufficiently resilient that with sufficient force the bead can be stretched in circumference to be forced over the rim flange.

When a tire gets punctured the tire is generally lifted and removed using jack and tool for removal of nut and bolts. But in all cases the tire needs to be lifted for comparatively less time and simultaneously required to be removed for example in a formula one race. In such a scenario a tire lifting and removing tool are required.

A number of different types of tire lifting and removing tools are available in the prior art. For example, see: U.S. patent application Ser. No. 11/683,793 to Quiles et al; U.S. Pat. No. 2,212,716 to Oliver E et al.; U.S. Pat. No. 5,265,661 to Loi; U.S. Pat. No. 8,220,851 to Dawes et al.; U.S. Pat. No. D412,271 to Roger.

Prior art U.S. patent application Ser. No. 11/683,793 discloses a rim mounted tire lifting bar including a feature on a first end to allow lifting of rim up tires and a feature on the second end on lifting of rim down tires for tires mounted on a rim. A second bar includes an element on one end to engage the lip of one tire sidewall and allow tipping up of the tire when the tires not mounted on a rim.

Another Prior art U.S. Pat. No. 8,220,851 discloses a tire lifting apparatus comprising an elongated shaft having a handle formed at a proximal end thereof, and further having a generally C-shaped prong formed at a distal end of the shaft. An arm, preferably traverses the distal end of the shaft and is juxtaposed adjacent to said prong for balancing the wheel/tire along a diametrical face thereof. Both the shaft and the arm, preferably have planar top and bottom faces for supporting the wheel/tire thereon.

The tool of the present invention by design includes all the advantages of the prior art and overcomes their shortcomings.

SUMMARY OF THE INVENTION

In the view of the foregoing disadvantages inherent in the known types of automobile tools now present in the prior art, the present invention provides an improved tire lifting and removing tool. As such, the general purpose of the present invention, which will be described subsequently in greater detail, is to provide a new and improved tire lifting and removing tool which has all the advantages of the prior art and none of the disadvantages.

An object of the invention is to provide a tire lifting and removing tool which is durable, simple and easy to use for various tire sizes.

It is another object of the present invention to provide a tool that facilitates shifting of tires on/off the trucks, heavy equipment for example back hoes, road graders and front end loaders and holding the tire at a place.

It is another object of the present invention to provide a tool for removing the spacer rings between the tires.

It is another object of the present invention to provide a tool that can also be used as a pry bar.

It is another object of the present invention to provide a tool which allows an upper tire bead to be lifted beyond its wheel rim flange in one lever-like operation.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention generally provides an automobile or vehicle tool that may be used as a tire lifting and removing tool. The tool is designed to go underneath the tire lip using a flat-curved end. The flat-curved end enables a user to set the tire on it. A base and fulcrum act as a support to the flat-curved and help lifting the tire above ground. The flat-curved end constitutes a round bar that acts as handle. The base and fulcrum are attached to the round bar handle.

Figure 1:
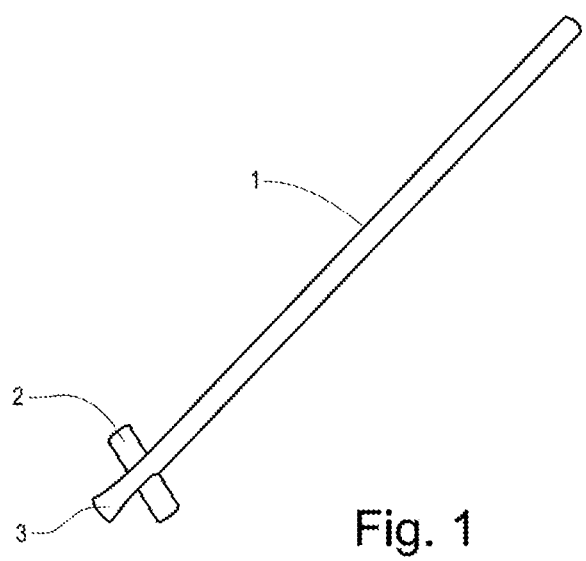
FIG. 1 depicts two dimensional view of the present invention.

Referring FIG. 1 shows a round bar handle 1 with two ends, a base and fulcrum 2 and a flat-curved end 3, which is near the base and forms part of the round bar handle.

Figure 2:
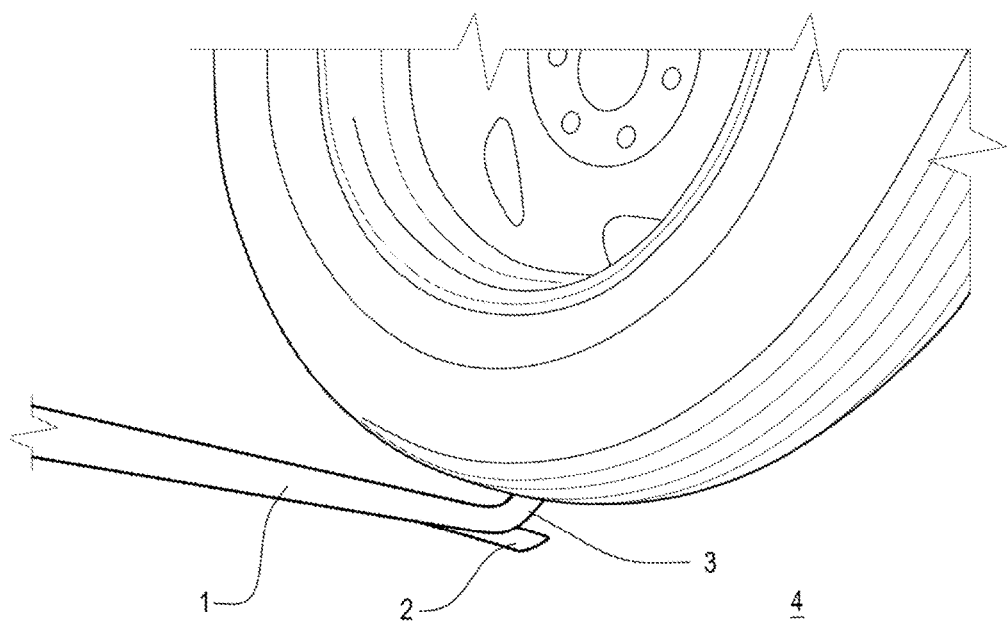
FIG. 2 depicts preferred embodiment of the present invention.

Again referring FIG. 2 shows the tool of the present invention in action. The fig. shows the round bar handle 1 with base and fulcrum 2 and flat-curved end 3 underneath the lip of the tire 4. The fig. shows the tire being lifted by the flat-curved end of the round bar handle by pushing down with round bar handle.

According to preferred embodiment of the invention when the user places the flat-curved end of the round bar handle, underneath the lip of the tire and applies force in upward direction. The base and fulcrum act as a support for the flat-curved end and also a force that acts in the opposite direction to the direction of application of force of flat-curved end. A continuous force is applied by the user to lift tire is applied using a flat-curved end.

The tire lifting and removing tool of the present invention facilitates shifting of tires on/off the trucks or the like, holding the tire at a place. The tool may be used for removing the spacer rings between the tires, as a pry bar and that allows an upper tire bead to be lifted beyond its wheel rim flange in one lever-like operation.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A tire lifting tool, consisting of:
a straight round bar having a first end and a second end,
the second end of the bar being flat and curved into one direction; and
a bar shaped base and fulcrum
being attached to the round bar at a point were the second end curves such that the second end is curved to a direction opposite of the base and fulcrum.

2. A method for lifting a tire; comprising steps of:
providing a tire lifting tool of claim 1;
slipping the curved flat second end underneath the tire;
pushing the first end of the tool downward, whereby the second end is lifted upward lifting the tire while the base and fulcrum rest on the ground.

* * * * *